United States Patent
Bueno Ruiz et al.

(10) Patent No.: US 6,760,211 B2
(45) Date of Patent: Jul. 6, 2004

(54) REMOTE ACTIVATION MECHANISM FOR EQUIPMENT HOLD DOWN AND RELEASE

(75) Inventors: Jose Ignacio Bueno Ruiz, Bilbao-Vizcaya (ES); Javier Vazquez Mato, Barakaldo-Vizcaya (ES)

(73) Assignee: Sener, Ingenieria Y Sistemas, S.A. (ES)

( * ) Notice: Subject to any disclaimer, the term of this patent is extended or adjusted under 35 U.S.C. 154(b) by 346 days.

(21) Appl. No.: 10/042,790

(22) Filed: Jan. 8, 2002

(65) Prior Publication Data

US 2003/0128491 A1 Jul. 10, 2003

(51) Int. Cl.[7] .............................................. H01H 47/00
(52) U.S. Cl. ...................... 361/160; 361/194; 361/206
(58) Field of Search ................................ 361/115, 160, 361/170, 194, 206

(56) References Cited

U.S. PATENT DOCUMENTS

| | | | | |
|---|---|---|---|---|
| 4,941,790 A | | 7/1990 | Kirn ........................... | 411/432 |
| 5,108,133 A | * | 4/1992 | Maloberti ..................... | 285/34 |
| 5,160,233 A | | 11/1992 | McKinnis .................... | 411/433 |
| 5,282,709 A | | 2/1994 | Chaput et al. ............... | 411/433 |
| 5,312,152 A | * | 5/1994 | Woebkenberg, Jr. et al. ........................ | 294/86.4 |
| 5,722,709 A | | 3/1998 | Lortz et al. ................. | 294/86.4 |
| 5,999,370 A | * | 12/1999 | Stone et al. .............. | 360/256.1 |

FOREIGN PATENT DOCUMENTS

| | | | | |
|---|---|---|---|---|
| JP | 07187094 | | 7/1995 | ............ B64G/1/64 |
| WO | WO 00/17051 | | 3/2000 | ............ B64G/1/64 |

* cited by examiner

Primary Examiner—Stephen W. Jackson
(74) Attorney, Agent, or Firm—Ostrolenk, Faber, Gerb & Soffen, LLP

(57) ABSTRACT

Remote activation mechanism for equipment hold down and release, composed of a fixed base (1); a disk with capacity to rotate (2); a ring (3) subdivided in independent segments; a helical torsion spring (4) mounted around the segmented, being in one end joined to the fixed base (1) and the other end to the disk (2); a retainer (5) to attach the hardware, that passes through the fixed base (1) and has means to be blocked by the segmented ring (3); a disk blocking system; and a disk liberation system (2). The disk (2) can potentially rotate from a position in which the helical torsion spring (4) is loaded hugging radially the segmented ring (3), up to a position in which the helical torsion spring (4) is unloaded, allowing the ring segments move radially away to release the retainer (5). The disk blocking system can be based on rollers or balls (12) with possibility of being inserted partially in disk grooves or in crown grooves. The disk (2) liberation system consists of an actuator that can be based on the use of shape memory alloy wire.

14 Claims, 2 Drawing Sheets

REMOTE ACTIVATION MECHANISM FOR EQUIPMENT HOLD DOWN AND RELEASE

The present invention refers to a remote activation mechanism for equipment hold down and release, specially applicable to the release of systems and equipment requiring a firm structural hold down, such as deployable antennas, solar panels, deployable radiators, as well as ejectable equipment (such as covers) of space vehicles, oceanographic equipment, aeronautics, military equipment, etc.

There are units or appendages needing remote release activation. A clear example, although not the only one, is the release of satellite appendages that require generally to be firmly joined to the satellite structure to survive the launch loads, while they require to be in a different configuration to be operative, decoupled, far away from the satellite main structure, or disconnected from the satellite structure. Appendages such as antennas, solar arrays, thermal radiators, experiments, ejectable protection covers etc., need to be released and deployed or ejected once the vehicle is in orbit.

Up to now, the problem of the release of such equipment has been solved using pyrotechnic release systems, such as cable/bar cutters, pushers and releasable appendage separation nuts. Those systems are based on the activation of a cutting, pushing, or separation mechanical system, using the pressure of the gases produced when a small explosive charge is detonated. Those actuators have been used extensively due to its compactness, simplicity and reliability. Nevertheless, those systems have the following inconveniences:

a) They can produce uncontrolled residue, such as metallic particles, polluting gases, etc. that in many cases cannot be afforded due to the type of systems the satellite contains, such as optical equipment, precision mechanisms, electronic equipment, etc.

b) They produce very high accelerations at high frequencies, which shock the main structure, transmitting this excitation to all the equipment located at the surroundings. Those accelerations at high frequencies are the main characteristic of explosive actuators, being extremely dangerous for the integrity of delicate equipment such as radio frequency and electronic equipment.

Those accelerations have two main causes. The first one is the explosion itself; the second is the sudden energy deformation liberation originated by the necessary preload of the hold down system. It is necessary to add that the achieved acceleration level is hardly attained by analysis due to the complexity of the model definition to represent the real event, and due to the uncertainty in the definition of the parameters involved in its simulation. Due to that, expensive tests on model representing the reality should be necessary.

c) Pyrotechnic systems are not reusable. They demand the complete substitution of the actuator to be able to maintain the system at the same operative level than before, as well as a new re-connection of the electric connectors necessary to provide the initiator activation current. That makes that in a satellite qualification test campaign to be performed before being launched and before being operated in orbit, could need of great quantity of pyrotechnic devices.

d) Pyrotechnic systems have an intrinsic risk during their manipulation, storage, or operation, being necessary to take care of potential electrostatic discharges and of potential electromagnetic interference that could activate those systems.

e) Pyrotechnic systems have not the capacity of being proven functionally before being used to achieve a confidence in their operation, being necessary the use of statistical data or test by lot on randomly selected units. Therefore, the pyrotechnic device that will be used in orbit could not be used on ground for test purposes, being impossible to perform a direct verification of the unit. Additionally, the connectors providing electric current to the pyrotechnic initiators should be disconnected and re-connected in each operation, meaning a significant increase of failure risk in that electrical connection.

f) The pyrotechnic systems are based on the detonation of an explosive material. This detonating material is usually provided with a limited life due to the degradation of the stability of explosive chemical composition with time.

An alternative to pyrotechnic systems, used in some cases, is the use of motorised hold down and release mechanisms. Those mechanisms are usually complex and heavy, suffering of lack of compactness, high cost, high sensibility to the environmental conditions, and low reliability.

The current tendency in the satellite construction is towards smaller vehicles with more sensitive instrumentation. The combination of highly sensitive equipment, in smaller and slighter structures in combination with hold down release mechanisms makes necessary the development of non explosive release actuators for not endangering the survival of the mission.

These inconveniences have given way to non-explosive hold down release mechanisms, based on three different concepts:

a) Mechanisms with a fusible wire, based on providing the sufficient heating energy to a wire that maintains the mechanism preload up to fuse it (or at least weaken it up to rupture). The rupture or fusion of that wire makes as a trigger that activates the mechanism that performs the release. Once the wire breaks or fuses and the mechanism is operated, the system should be rearmed and the initiator containing the fused or broken wire should be substituted to have the device ready for a new operation.

b) Mechanisms with paraffin actuators, based in the paraffin increase of volume when it fuses (15% approximately). This increase of volume is controlled as to push a stem that can activate the release. These mechanisms are voluminous, complex, expensive and very slow in their performance, being able to present problems of leakage or molecular contamination in vacuum environment.

c) Mechanism with shape memory alloy piece, based in the use of the significant contraction or expansion of shape memory alloys when the piece reaches its transition temperature, activating directly the release, by breaking the joining bolt or by changing the geometry of the element maintaining the joint sufficiently as to release the fastener or the retainer.

Pieces manufactured with shape memory alloys, being processed in a suitable way and under certain circumstances, have the property of being able to change their form cyclically with their temperature, being able to reach a deformation of 4%.

Those mechanisms can be activated, or using direct application of heat on the shape memory alloy piece up to reaching its transformation temperature, or applying a direct electric current through this piece in order to heat it up to reaching their transformation temperature. They are based on the rupture of the fastener or retainer, being very compact. But they have the inconvenience that they can originate particles of the fractured piece that could endanger the operation of delicate equipment. Additionally, they should be substituted completely for a new use, making impossible their direct verification before operation.

Those mechanisms, based on the geometry change of the element maintaining the joint as to release the fastener or the retainer, are voluminous and heavy, having lack of compactness. They are usually used in very specialised applications that usually are not extendable to other uses.

All them highly reduce the high accelerations at high frequencies that characterises to pyrotechnic devices as they do not need any explosion, and release activation is not so sudden but more progressive than in the case of pyrotechnic devices. Nevertheless, they already have the above described inconveniences.

The objective of the present invention is to solve the problems of pyrotechnic devices and the inconveniences of the existing non-explosive actuators, by means of an actuator that fulfils the following characteristics.

a) Non pyrotechnic device (no explosion).
b) High load carrying capability, with easy preloading operation.
c) Non causing high acceleration during operation (progressive release).
d) Conceptually simple and easy operational handling to provide high reliability.
e) Reusable without any consumable.
f) Easy rearming without disassemble the device from its location, without requiring electrical disconnection.
g) Redundant activation system based in redundant electrical circuit.
h) Compatible with mechanism manual activation without requiring any configuration change.
i) Non safety critical.
j) Using non life limited components.
k) Cost effective.

In order to give solution to those problems, it was identified that a device provided with a shape memory alloy element as a trigger that liberates a mechanism able to produce the necessary geometric changes as to allow the release of a fastener or a retainer can be adequate.

Then the primary actuation can be performed by heating a shape memory alloy piece capable of recovering its preliminary shape once the temperature returns to a value below its transformation temperature. One of the most common form in the market for shape memory alloys supplying is the wire. Applying an electrical current between both ends of a shape memory alloy wire, when it reaches its transformation temperature, provides a contraction due to the change of its internal structure (from martensitic at ambient temperatures to austenitic at temperatures higher than its transformation temperature). That contraction causes a relative displacement of 4% of its length in its free end. This effect shows a very good repeatability in a high number of operation cycles, therefore it can be used as a trigger to activate the blocking system that maintains the preload of the hold down.

A very simple and efficient way to provide high load carrying capability for hardware hold down is the one formed by a ring around a retainer. Such is the case of a bolt-nut system. For that device a segmented nut (at least in three pieces) was selected in order to liberate the bolt when those segments moves radially away from the bolt central axis, releasing the joint of the equipment to be deployed or ejected. Those nut segments should move radially away a distance bigger than the bolt thread depth. Nevertheless, the number, the configuration and the geometry of segments can be changed if the fastener is substituted by a retainer, without changing the concept of the device.

In order to get that the trigger activates the radial displacement of the segments, it is necessary a mechanism that maintains the segments in position to support the preload generated by the bolt, and is capable of being released to allow the radial movement of the segments to liberate the joint.

The mechanism of the invention is based on the diameter difference that exists in a helical torsion spring between its loaded configuration and its free configuration, to provide the opening of a series of segments that compose a ring around a retainer. That is achieved by means of a helical torsion spring of an appropriate geometry as to provide a diameter variation bigger than twice the depth of the retainer groove (or twice the depth of the bolt thread), when rotating an end of the spring the adequate angle. The change from the spring loaded configuration having smaller internal diameter to the spring free configuration having bigger internal diameter, is achieved by letting one end of the helical torsion spring get free. Such segmented ring or nut allows, when moving radially away, the release of the holding part of a retainer or the threaded part of a fastener, which, up to that moment, held the equipment.

When using a retainer instead of a bolt, the geometry of the segments and their total number is directly related with the retainer geometry. In that case the helical torsion spring should provide an internal diameter change big enough as to allow the segments to move radially away, freeing the retainer to get out of its location.

The segments rest on slopes radially disposed in a piece which is rigidly joined to the device housing in order to make the segments separation easy once the helical torsion spring is released. At the other end of the segments, a piece having the possibility of free rotation, maintains the segments in position in order to allow the bolt to be threaded easily.

Also, among those slopes and being part of the same piece, a set of keys are disposed in order to avoid the rotation of the segments when the preloading is provided.

One of the helical torsion spring ends remains fixed while the other one is connected with a disk with capacity to rotate. Rotating the disk manually or using a source of external torque we can provide the necessary load to the spring and in this way reduce its diameter until hugging the segments. Once in this position, the disk has to be maintained blocked.

The trigger system that liberates the disk, and then the helical torsion spring, is based on a crown with possibility of rotation. Between disk and crown there is a cage, joined to the housing, with one or more slots to accommodate one or more balls or rollers (for clarity only rollers are mentioned from now on). Both, crown and disk are provided with axial grooves in a number identical to the number of rollers of the cage. In the crown those grooves are disposed in the internal cylindrical surface and in the disk in its external cylindrical surface. As disk and crown are susceptible to be rotated, both sets of grooves can be faced in order to allow the rollers to be located partially inside the crown or partially inside the disk.

When the device is in armed configuration, the spring is preloaded, the bolt is retained, the roller or rollers are inside the disk grooves blocking it, and the crown grooves are not faced with the cage slots preventing the rollers from moving out of the disk grooves to the crown grooves. As soon as the crown rotates up to having its grooves to the rollers, those rollers leave the disk due to the effect of the load of the helical torsion spring, and they moves to the crown grooves, allowing the disk turn and the unloading of the helical torsion spring. This allows the separation of the segments of the ring (or nut), releasing the retainer (or the bolt).

Therefore, a small displacement that faces the crown groove to the disk groove will allow the activation of the release mechanism.

There are several ways to perform the turn of the crown: manually, with an electromagnet, with an electric motor, etc.

Nevertheless, in order to get a compact design, according to one of the preferred arrangements, the rotation of the crown is performed by the action of a shape memory alloy wire, which, when provided with enough electric current to heat it until the transformation temperature, contracts due to the change of its internal structure. In this way, the primary actuator (shape memory alloy wire) transforms electric power in heat, and this in mechanical energy providing the necessary crown rotation to activate the roller trigger.

This mechanical system discharges the high bolt preload using a small actuation force. Additionally, the preload of the bolt is discharged progressively since the unloading of the helical torsion spring is not instantaneous but rather progressive turn by turn.

The use of a shape memory alloy wire allows the reuse of the mechanism, without requiring the substitution of any component, once the device is rearmed and the hold down attachment bolt preloaded. The rearming of the mechanism in ambient conditions can be carried out in seconds after having activated it.

The duration of the release can be adjusted to the necessities of each particular application, varying the wire heating speed of the shape memory alloy piece, being able to perform the actuation in few milliseconds. This is achieved varying the intensity of the electric current that goes through that component.

The rearming can be carried out in different ways. One of them is providing access to disk and crown from outside the housing through devoted slots.

Their function is to provide the possibility of facing, manually from outside, the crown groove and the disk groove with the cage slot to displace the roller and allow the disk rotation to provide, also manually from outside, the preload to the helical torsion spring. As soon as the helical torsion spring is loaded and the disk groove is faced to the crown groove, the crown has capacity to return automatically back by the action of a set of compression springs provided for that purpose. Those compression springs displace the crown groove to one side of the cage slot, blocking the disk, and leaving the apparatus ready for a new activation.

The rearming can be also performed providing lateral access to the crown, and providing access to the disk from the bolt position when it is not jet located in position.

Electrical redundancy can be provided to the primary activation electric circuit disposing two independent shape memory alloy wires to act on the same crown. In that way the reliability of the device is substantially increased as if one electrical circuit fails, there is another one available.

The characteristics of the remote activation mechanism for equipment hold down and release are understood more easily with the following description carried out with reference to the enclosed drawings, in which a possible realisation form is represented. Although an specific arrangement of the present invention is here below described with reference to the drawings, it should be understood that such arrangement is by way of example only and merely illustrative of a possible arrangement of the many possible specific arrangements which can represent applications of the principles of the present invention. Various changes and modifications obvious to one skilled in the art related with the present invention are deemed to be within the scope of the present invention as defined in detail in the appended claims.

Figure 1:
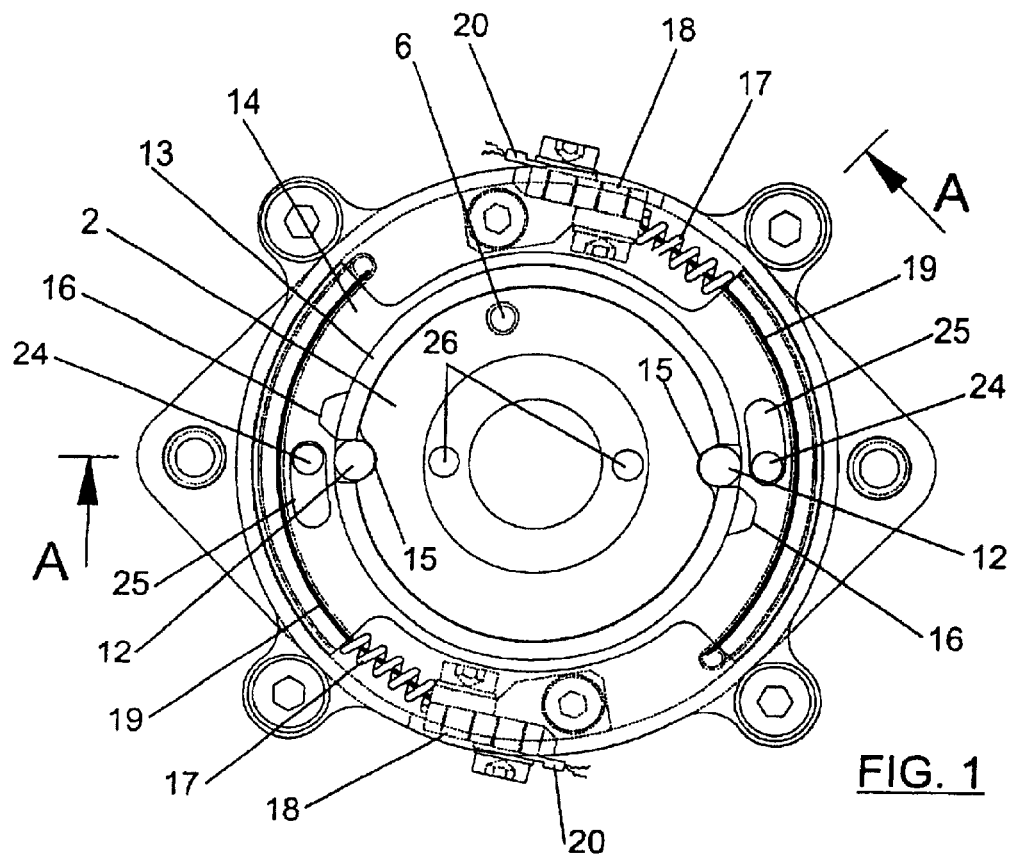
FIG. 1 is a top view of the mechanism without the upper part of the housing. It shows the details of the activation system.
Figure 2:
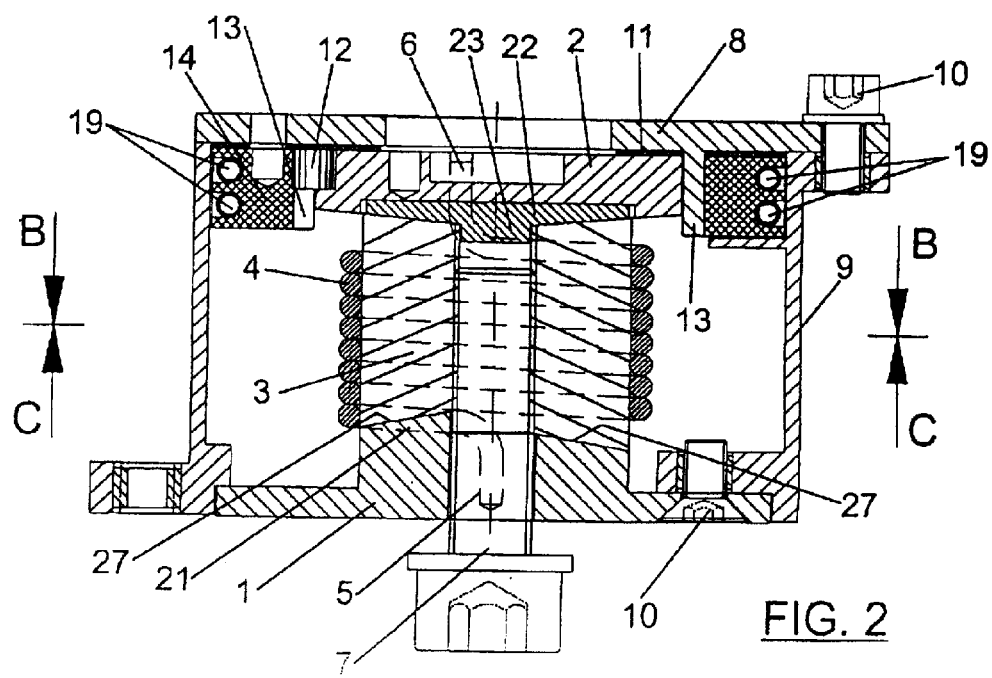
FIG. 2 is a diametrical section of the hold down and release mechanism, defined as A—A in FIG. 1.

As shown in the FIGS. 1 and 2, the mechanism of the invention includes a fixed base 1; a disk 2 with possibility of rotation, parallel to the fixed base 1; a segmented ring 3 mounted between the fixed base 1 and the disk 2; a helical torsion spring 4 mounted around the segmented ring 3, with one of its ends 5 fixed to the base 1 and the other end 6 fixed to the disk 2; a retainer 7 for equipment fixation that passes through the fixed base 1 and with provision for being blocked by the segmented ring 3; as well as a blocking device and a disk liberation system whose constitution will be exposed later on.

Disk 2 can rotate from a position in which the helical torsion spring 4 is loaded hugging radially the segmented ring 3, maintaining the segments as close as possible, blocking in that way the retainer, up to a position in which the helical torsion spring 4 is unloaded, having a bigger internal diameter, permitting the ring segments move radially away to allow the release of the retainer 7.

Figure 3:
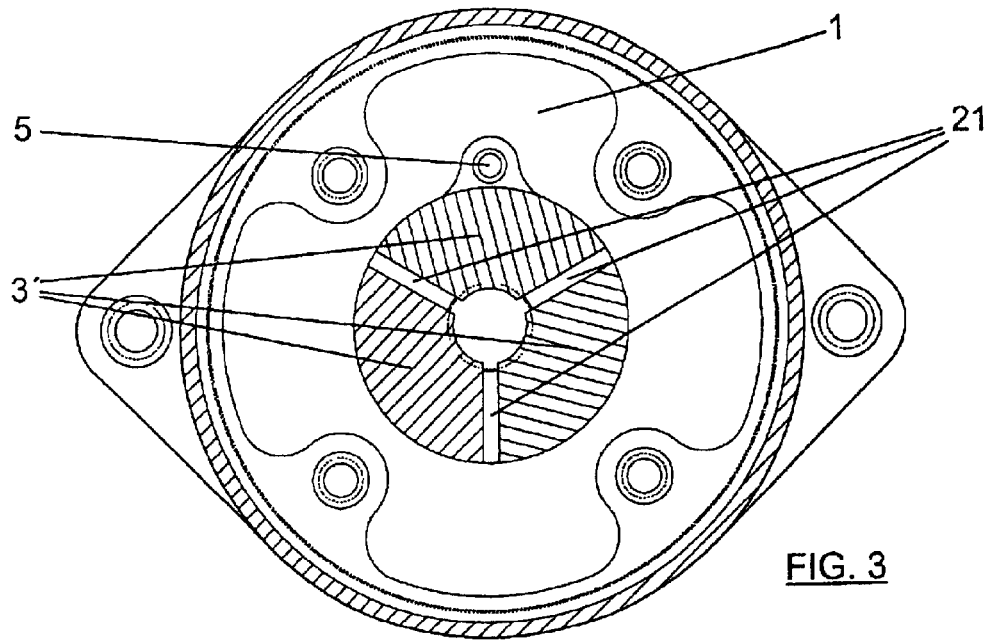
FIG. 3 is a transversal section of the mechanism, defined as B—B in FIG. 2.
Figure 4:
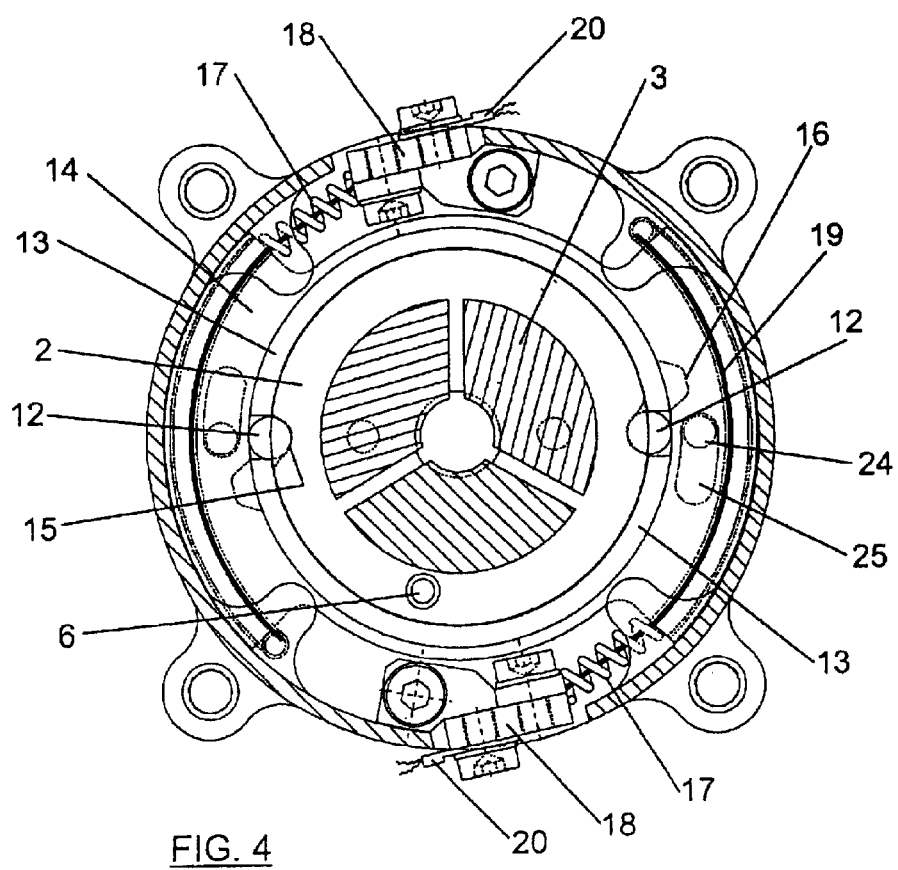
FIG. 4 is a transversal section of the mechanism, defined as C—C in FIG. 2.

Preferably, the ring 3 is constituted by a nut subdivided in three or more independent segments that are referred with the number 3' in the FIG. 3 and 4. Additionally, the retainer 7 is preferably a bolt treaded to the segmented nut 3' when the segments are in their closest position, compressed by the spring 4. That bolt is free to be removed when segments 3' are open due to the discharge of the spring 4.

The retainer or bolt 7 constitutes the equipment attachment to which the mechanism of the invention provides the hold down and release means.

As shown in FIG. 2, The mechanism includes a housing composed by a cover 8 and a lateral enclosure 9 that are fixed to the cover B and to the fixed base 1 by means of, for instance, screws 10. A layer of low friction material is disposed in between the housing cover 8 and the disk 2 in order to minimise the friction during the rotation of the disk 2.

The disk blocking system can consist of a trigger mechanism capable of acting against the potential rotation of the disk 2.

In the preferred arrangement shown in the figures, this trigger mechanism is composed of two rollers or balls 12, FIGS. 1 and 4, disposed in diametrically opposite locations in the corresponding slots of the cage 13. This cage is composed of a cylindrical wall joined to the cover 8, being located between the disk 2 and the crown 14, as can be seen in FIGS. 1, 2 and 4. As shown in FIGS. 1 and 4, the disk 2 is provided in its external cylindrical surface, faced to the cage 13, with two grooves 15 disposed in diametrically opposite locations, sized as to allow the rollers 12 to be partially inserted.

In the same way, the crown 14 is provided in its internal cylindrical surface, faced to the cage 13, with two grooves 16 disposed in diametrically opposite locations, also sized as to allow the rollers 12 to be partially inserted.

In FIGS. 1, 2 and 3 the helical torsion spring is loaded, hugging the segments 3' of the nut 3, maintaining the bolt 7 threaded.

FIGS. 1 and 4 show the disk 2, the cage 13 and the crown 14 in the configuration where the rollers 12 are inserted in the disk grooves 15 and maintained in that position by the crown 14, whose grooves 16 are not faced to the slots of the cage 13. In that way the disk 2 is not allowed to rotate, maintaining the helical torsion spring 4 in its loaded configuration.

The crown 14 is maintained in such position (blocking the disk 2) by a set of compression springs 17 mounted tangentially between the crown and a stop 18 fixed to the housing.

Such as exposed previously, the mechanism includes a system to liberate the disk 2, which is composed of two shape memory alloy material wires 19 located in diametrically opposed positions, fixed to the stop 18 in one end and anchored to the crown 14 in the opposite end. Those wires contract by heating them making an electrical current passing through them. To do so, wire ends are connected via electrical terminals 20 to en external electrical power source.

The wires contract a magnitude sufficient as to cause the rotation of the crown 14 against the force of the compression springs up to reaching the configuration in which the crown grooves 16 are faced to the cage slots and then to the disk grooves 15 with the rollers 12. In that moment the rollers 12 are pushed away from the disk grooves 15 by the effect of the force performed by the helical torsion spring 4, being inserted in the crown grooves 16, allowing the disk rotation and the discharge of the spring 4. The shape of the disk grooves 15, including a slope in the area of contact with the rollers, facilitates the removal of the rollers 12 from the disk grooves. Then the spring 4 is discharged, allowing the segments 3' separation, releasing the bolt 7.

As shown in FIG. 2, two sets of shape memory alloy wires 19 can be provided for redundancy purposes to achieve higher reliability.

In order to make the segments 3' separation easier when the spring 4 is discharged, the fixed base 1 where the segments rest, can be provided with axial slopes 27 towards the outside, in a quantity identical to the number of segments. Additionally, as shown in FIGS. 2 and 3, the fixed base 1 is provided with radial keys 21 located in between each pair of segments 3', in order to maintain the segments in position.

FIG. 2 shows that the disk 2 has, in the area of contact with the segments 3', a supplement 22 provided with a central cylindrical shape 23 that maintains the internal diameter of the segmented nut 3, allowing an easy bolt 7 installation and preload.

As shown in FIG. 2, the wires 19 are installed inside isolating tubes in order to avoid short-circuit when the system is electrically powered.

The radial keys 21, shown in FIGS. 2 and 3, maintains the segments in position and additionally prevent the rotation of the nut 3 during the installation of the bolt 7.

The mechanism of the invention can have provisions for rearming, such as some holes 24 in the crown with accessibility from outside through the slots 25 of the cover 8, as shown in FIGS. 1 and 2. That allows the crown grooves 16 to be faced to cage slots in order to allow the rollers being inserted as to be possible the free rotation of the disk 2 to perform, with an external torque source, the spring loading, using the provided holes 26 in the disk 2. As soon as the helical torsion spring 4 is loaded and the disk grooves 15 faced again to the rollers, the crown returns, by the effect of the a compression springs 17, to the configuration in which crown grooves 16 are not faced to the cage slots, and therefore the disk is then blocked and the device is armed and ready to be operated again.

The mechanism of the invention can include a trigger different to the one described above, containing, for instance, a latch, a leaf spring, a cam, etc. Also, the mechanism can include provisions for bolt capture when it is released. Even, the mechanism can be provided with another kind of shape memory alloy element different from a wire, or with other kind of heating source different from the electric current passing though the material. Furthermore, another kind of primary actuation a shape memory alloy element can be used, electric motor, an electromagnet, etc.

What is claimed is:

1. A remote activation mechanism for equipment hold down and release, characterised by being composed of a fixed base; a disk parallel to the fixed base with capacity to rotate; a segmented ring mounted in between said fixed base and said disk; an helical torsion spring mounted around said segmented ring, having one of its ends joined to said fixed base and the other to said disk; a retainer to attach the equipment, that passes through said fixed base and has means to be blocked by said segmented ring; a disk blocking system; and a disk liberation system; in which said disk can potentially rotate from a position in which said helical torsion spring is loaded hugging radially said segmented ring maintaining the segments as close as possible, up to a position in which said helical torsion spring is unloaded having a bigger internal diameter, allowing the ring segments move radially away; and in which said retainer is maintained in position by said segmented ring when said segmented ring is in its closed configuration, and said retainer is released when said segmented ring is in opened configuration with its segments separated; and in which said disk blocking system is composed of a trigger capable of not allowing the rotation of said disk; and in which said disk liberation system consist of an actuator capable of activating the trigger and liberate said disk, discharging said helical torsion spring.

2. A mechanism as in claim 1, further comprising a housing with a cover supporting said disk using an intermediate layer of low friction material, and with a lateral enclosure around said helical torsion spring and fixed to said fixed base and said cover.

3. A mechanism as in claim 1, wherein said fixed base has radial slopes, where the segments of the ring rest, towards the outside to facilitate the segments separation when the helical torsion spring is discharged, and has radial keys located between consecutive slopes that separate and maintain segments in position.

4. A mechanism as in claim 1, wherein said disk has a supplement provided with a central cylindrical shape that maintains the internal diameter of the segmented ring.

5. A mechanism as in claim 1, wherein said ring is divided in at least two, and preferably three, segments, that in their closest position are maintained separated one from other by the keys of the fixed base.

6. A mechanism as in claim 1 wherein said trigger consist of at least one, and preferably two, rollers or balls that are located in diametrically opposed positions of the cage of the housing, disposed between disk and crown, both with possibility of partial rotation, having said disk and said crown the corresponding grooves in the surface in contact with the cage, sized as to allow the rollers or balls to be partially inserted, having the crown the possibility of turn around the cage between a position in which the crown grooves and disk grooves are not faced and the rollers or balls are partially inserted in the disk blocking it, and another position in which the crown grooves and the disk grooves are faced permitting the rollers or balls to be inserted in the crown grooves liberating the disk and allowing disk rotation.

7. A mechanism as in claim 1, further comprising one or several springs located between the crown and the housing that pushes the crown towards the position in which the crown grooves are not faced to the cage slots, and also shape memory alloy wires that when activated operate on the crown opposite to the said spring, having possibility of contraction as to move the crown up to facing its grooves to the cage slots.

8. A mechanism as in claim 1, wherein the actuator consist of a shape memory alloy wire that provides a contraction when heated up to its transformation temperature, being heated by conventional means such as increase of ambient temperature, use of heaters, etc.

9. A mechanism as in claim 1, wherein said shape memory alloy wire are heated by passing electrical current through it, being provided the necessary electrical isolation.

10. A mechanism as in claim 1, wherein said crown and said disk are provided with means, as holes or anchors, as to allow their connection with external actuation means to move pieces to the armed position, providing also the necessary accessibility by means of holes and slots in the housing and in the cover.

11. A mechanism as in claim 1, wherein said segmented ring is a segmented nut, and said retainer is a bolt able to be threaded in the segmented nut when the nut is closed with the segments as close as possible.

12. A mechanism as in claim 3, wherein said ring is divided in at least two, and preferably three, segments, that in their closest position are maintained separated one from other by the keys of the fixed base.

13. A mechanism as in claim 6, further comprising one or several springs located between the crown and the housing that pushes the crown towards the position in which the crown grooves are not faced to the cage slots, and also shape memory alloy wires that when activated operate on the crown opposite to the said spring, having possibility of contraction as to move the crown up to facing its grooves to the cage slots.

14. A mechanism as in claim 8, wherein said shape memory alloy wire are heated by passing electrical current through it, being provided the necessary electrical isolation.

* * * * *